Patented July 19, 1932

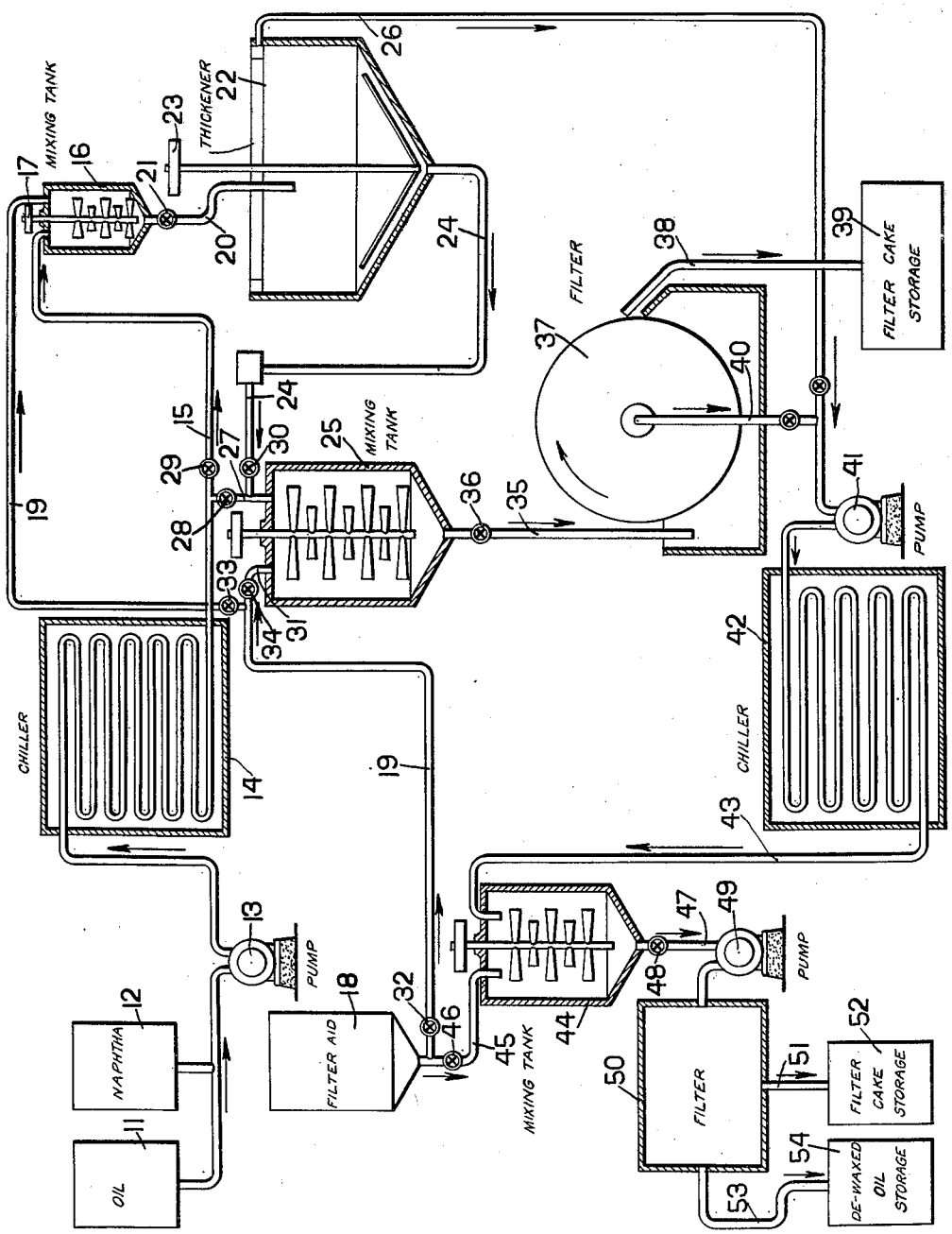

1,867,580

UNITED STATES PATENT OFFICE

ROBERT E. MANLEY, OF PORT ARTHUR, TEXAS, ASSIGNOR TO THE TEXAS COMPANY, OF NEW YORK, N. Y., A CORPORATION OF DELAWARE

DEWAXING HYDROCARBON OIL

Application filed April 18, 1928. Serial No. 270,868.

This invention relates to treating hydrocarbon oil and more particularly relates to the treatment of hydrocarbon oil for the removal of solid and semi-solid waxy constituents, such as paraffin wax, whereby the temperature of congelation of the oil is reduced.

In the present invention wax-bearing hydrocarbon lubricating oil, which may have been subjected to any desired preliminary refining treatment, is subjected to treatment to effect dewaxing in a plurality of stages, each stage comprising chilling the oil to effect precipitation of wax constituents dissolved therein and then separating the oil from the precipitated wax constituents by filtration in the presence of a comminuted solid filter-aid material, the filtration being carried out at temperatures below that at which the wax constituents to be removed will be precipitated. In each succeeding stage of the treatment, the filtration of wax from oil in the presence of filter-aid material is carried on at a lower temperature than that maintained during the preceding step of filtration, as a result of which the wax constituents which are most readily precipitated from the oil by chilling, that is, the higher melting point waxes, are separated in the first filtration while, during a subsequent filtration carried on at successively lower temperatures, the waxes separated are of relatively lower melting point.

In one form of the invention, the first stage of the dewaxing treatment may include chilling the oil to effect precipitation of wax constituents, mixing with a filter-aid material and concentrating the precipitated wax and filter-aid material in one portion of the oil by settling. The oil is recovered from the concentrate by filtration and, together with that portion of the oil from which the wax was settled, may be treated by an additional stage (or stages) of the process comprising chilling and filtering in the presence of a filter-aid material.

The invention may be readily understood from a description of the procedure of the process considered in connection with the accompanying drawing, which represents a somewhat diagrammatic sectional elevation of apparatus within the invention and suitable for use in carrying on various steps of the dewaxing process.

Referring to the drawing, there is illustrated a source of oil to be dewaxed as the tank 11 and a source of a suitable diluent, for example petroleum naphtha, as the tank 12. A pump 13 is provided for pumping the oil from the tank 11, together with the naphtha diluent from the tank 12 if so desired, through suitable connections to the chiller 14. The chiller may be of any suitable design and is ordinarily the type in which the oil passes in counter current, but not in direct contact with, a flow of cold brine or like refrigerating means. From the chiller 14 the oil passes, by means of the line 15, to a mixing tank 16 which consists of a vessel, heavily insulated to prevent absorption of heat by the chilled oil, and supplied with suitable agitating means 17.

A source of supply for filter-aid material, such as the tank 18 is connected through the line 19 to the mixing tank 16, whereby filter-aid material may be supplied to mixing tank 16.

From the mixing tank 16 the mixture of filter-aid material and chilled oil may pass, by means of the line 20 controlled by the valve 21, to a settling or thickening apparatus 22, which is of a type similar to that ordinarily known as a Dorr thickener, which is provided with suitable stirring apparatus 23. Within the thickener 22, which is heavily insulated to prevent absorption of heat by its contents, a settling or classification takes place, the precipitated wax and filter-aid material being concentrated at the bottom and passing off continuously through the line 24 to the second mixing tank 25, which may be of substantially the same construction as the mixing tank 16. The oil, from which the wax and filter-aid have been settled, overflows from the thickener 22 through the line 26.

A by-pass line 27, having a valve 28, is connected across the lines 15 and 24 whereby, through the proper manipulation of the valves 29 and 30, the mixing tank 16 and the thickener 22 may be cut off from the rest of the apparatus, if desired.

In the mixing tank 25 the concentrated suspension of wax and filter-aid in oil may be mixed with a further quantity of filter-aid supplied from the tank 18 through the lines 19 and 31, the quantity being regulated by means of valves 32, 33, and 34. After being thoroughly mixed, the contents of the mixing vessel 25 may be discharged through the line 35, controlled by means of the valve 36 to the filter 37, which may consist of any desirable type of filter but which is preferably a continuous vacuum filter of a type similar to that generally known as an Oliver or an American continuous filter.

Upon the filter 37 the precipitated wax and filter-aid material is deposited in the form of a cake which is continuously discharged through suitable means 38 to storage 39. The filtered oil is continuously discharged through the line 40, joining the overflow line 26 from the thickener 22, the lines being connected to the pump 41 which forces the oil through a second chiller 42.

From the chiller 42 the oil may flow through the line 43 to a third mixing tank 44, which is substantially of the same type as the mixing tanks 16 and 25, where the oil may be mixed with an additional quantity of filter-aid material supplied from the tank 18 through the line 45 controlled by the valve 46. The mixture of oil, precipitated wax, and filter-aid material passes from the mixing tank 44, through the line 47 controlled by the valve 48, and is forced by means of the pump 49 through the filter 50. The filter 50 may be of any suitable type but is preferably a filter adapted for operation under relatively high pressure, such for example as the type generally known as a Kelly filter, and should be well insulated to avoid absorption of heat by the oil. From the filter 50 the filter cake of wax and filter-aid material is discharged through the line 51 to suitable storage 52, while the dewaxed oil is discharged through the line 53 to storage 54.

The operation of the process in connection with the apparatus shown may be as follows:

The oil to be dewaxed for example a treated filtered cylinder stock having a pour test of about 100° F. and a wax content, by analysis, of about 12 per cent, passes from the storage tank 11 to the pump 13. In the dewaxing of an oil of this type it is ordinarily necessary to dilute the oil with a less viscous solvent, and accordingly the oil may be combined with petroleum naphtha from the tank 12 in about equal proportions. The diluted oil is forced through the chiller 14 by means of the pump 13 and the temperature of the oil is reduced to the degree desired to effect precipitation of solid and semi-solid wax constituents contained therein.

The temperature at which the diluted stock is chilled will depend upon the degree of dewaxing which it is desired to effect in the first stage of the process. In the case of the particular oil described as an example, it may be that it is desirable to remove approximately one-fourth of the wax content in the first stage of the process, and accordingly the oil passing through the chiller 14 may be chilled to a temperature of about 45° F. which will serve to precipitate the higher melting portion of the wax.

From the chiller 14 the chilled oil passes through the line 15 to the mixing tank 16 where it is mixed with a suitable filter-aid material such as finely pulverized diatomaceous earth in the desired proportion, which may be in this instance about 10 to 30 pounds of the filter-aid for each barrel of oil. Diatomaceous earth is supplied from the source of supply 18 through the line 19 and may be either in the form of dry powder or as a suspension in cool naphtha.

The earth is very finely powdered and the contents of the tank 16 are continuously agitated by means of the agitator 17 to prevent settling of the precipitated wax and earth. From the mixing tank 16 the chilled diluted oil containing, in suspension, precipitated wax constituents and diatomaceous earth passes to the thickener 22 through the line 20, the flow being regulated by means of the valve 21. In the thickener a settling or classification takes place whereby the precipitated wax and filter-aid material are concentrated in the lower part of the apparatus and flow continuously therefrom through the line 24, while the portion of the oil from which the wax and filter-aid material have settled is continuously decanted through the line 26.

The thickener is heavily insulated to prevent absorption of heat by its contents but, owing to the large exposed surface, the temperature of the oil will ordinarily be somewhat increased. For example, if the oil issues from the chiller 14 at a temperature at 45° F. the temperature maintained in the thickener 22 may be of the order of about 50° F.

The concentrated suspension of precipitated wax and filter-aid material from the thickener 22 flowing through the line 24 enters the mixing tank 25, which is of substantially the same construction as the mixing tank 16. Here an additional quantity of filter-aid material may be mixed with the concentrate, the material being supplied from the tank 18 through the lines 19 and 31, regulated by means of the valves 32, 33, and 34, after which the oil, containing wax and filter-aid material in suspension, is fed through the line 35, controlled by the valve 36, to the filter 37.

If desired, the valves 29 and 30 may be closed and the valve 28 opened thereby bypassing the mixing tank 16 and the thickener 22. thus allowing the oil from the chiller 14 to flow directly into the mixing tank 25 where it may be mixed with filter-aid material in the desired proportion and may then pass directly to the filter through the line 35. However, the production of a concentrate of wax and filter-aid material by means of the settling accomplished in the thickener 22 is usually desirable in that, by this procedure, there is a smaller volume of material produced which the filter 37 must handle.

The filter 37 is preferably of the continuous vacuum type, which may be used, at this stage of the process, because of the easy filtering characteristics of the mixture of filter-aid material and the precipitated nigher melting wax. The filter should be insulated, of course, to prevent loss of refrigeration insofar as possible. The oil supplied through the line 35 to the filter 37, in passing therethrough, deposits upon the filtering surface a filter cake consisting of filter-aid material and precipitated wax, which is continuously discharged to suitable storage 39. The filtered oil is continuously discharged through the line 40 to the pump 41. If the thickener has been in use, the oil decanted therefrom through the line 26 may be combined with the oil discharged from the filter 37 through the line 40 and the combined streams conducted to the pump 41 which forces the oil through the chiller 42. At this point in the process, the oil may have been so dewaxed that it would have a pour test of approximately 60° F., if the naphtha diluent were removed. In the chiller 42 the oil is chilled to a lower temperature than that produced in the chiller 14, whereby further wax is precipitated from the oil, this wax being of a lower melting point than that precipitated from the first chilling. In the particular example of the process under discussion, it may be assumed that the dewaxing process will consist of only two stages and that a final temperature of congelation in the dewaxed oil of about 25° F. is desirable. Under such conditions the temperature to which the oil is chilled in the chiller 42 may be about 10° to 15° F. which will effect precipitation of the bulk of the remaining wax content of the oil.

From the chiller 42 the oil is conducted through the line 43 to the mixing tank 44, which is of substantially the same construction as the mixing tank 25. Here the oil is again mixed with diatomaceous earth in suitable proportion, which may be about 10 to 30 pounds of earth for each barrel of oil, the mixture passing from the mixing tank 44, through the line 47, controlled by the valve 48, to the pump 49, which forces the oil through the filter 50. Due to the fact that the oil at this stage of the process is below the freezing point of water, it is important that the filter-aid material shall be substantially free from moisture as otherwise ice will be formed in its pores thereby greatly reducing its efficiency.

Passing through the filter 50 the precipitated wax and diatomaceous earth are deposited in the form of a filter cake which is discharged through suitable means 51 to storage 52, while the filtered dewaxed oil is discharged through the line 53 to storage 54. As the wax precipitated in the chiller 42 is of the comparatively lower melting variety and as at the lower temperatures employed the viscosity of the oil is increased, it is desirable that the filter 50 be of a type suitable for operation under comparatively higher pressures and it is found that a filter of the type generally known as the Kelly filter, which may operate at pressures in the neighborhood of 200 to 300 pounds per square inch, is particularly suited for this purpose. The dewaxed oil, being in the form of a solution in the naphtha diluent, may be subjected to distillation for the removal of the diluent which may be returned to the tank 12 and further used, if so desired.

In the discussion of the operation of the process the dewaxing of a particular type of hydrocarbon lubricating oil has been described as being effected in two stages, each stage comprising the steps of chilling the oil to effect precipitation of wax constituents contained therein and then separating the precipitated wax by filtration in the presence of a filter-aid material. It should be understood, however, that the process may include the treatment of the oil in any desired number of stages, the number being determined, in general, by the wax content of the oil and the degree of dewaxing desired.

The process is of particular advantage in the dewaxing of oils having a relatively large wax content, for example, in excess of 10 to 12 per cent by weight, as it is found that not only is it exceedingly difficult to dewax an oil of this nature in a single stage treatment but also that such single stage treatment is comparatively uneconomical. The process also provides for the segregation of the higher melting portions of wax from the lower melting portions. Such separation is of distinct advantage from an economical standpoint in the further purification and refining of the wax and may, in the case of the higher melting portion of the wax, render the usual sweating operation unnecessary.

Obviously many modifications and variations of the invention, as hereinbefore set forth, may be made without departing from the spirit and scope thereof, and therefore, only such limitations should be imposed as are indicated in the appended claims.

I claim:

1. The process of dewaxing hydrocarbon oil which comprises chilling the oil to precipitate a portion of the wax contents, continuously settling the precipitated wax in the presence of a filter-aid material to effect concentration of the wax in one portion of the oil, separating the concentrate from that portion of the oil from which the wax has been settled, filtering said concentrate to form a filtrate free from precipitated wax and filter-aid material, chilling said filtrate and the portion of oil from which wax was settled to a lower temperature at which further wax is precipitated, and separating the precipitated wax from the oil by filtration in the presence of a filter-aid material.

2. Apparatus for dewaxing hydrocarbon oil comprising, in combination, chilling means for cooling the oil to temperatures adapted for the precipitation of paraffin wax constituents, means for mixing a filter-aid material with the chilled oil, settling means adapted for concentrating precipitated wax and filter-aid material in a portion of the oil, means for filtering wax and filter-aid material from said portion of oil, means for cooling the filtered oil to a lower temperature adapted for further precipitation of paraffin wax constituents, means for mixing a filter-aid material with the cooler oil, and filtering means for the final separation of precipitated wax and filter-aid material from the oil.

3. Apparatus for dewaxing hydrocarbon oil comprising, in combination, chilling means for cooling the oil to temperatures adapted for the precipitation of paraffin wax constituents, means for mixing a filter-aid material with the chilled oil, settling means adapted for concentrating precipitated wax and filter-aid material in a portion of the oil, means for filtering wax and filter-aid material from said portion of oil at relatively low pressures, means for cooling the filtered oil to a lower temperature adapted for further precipitation of paraffin wax constituents, means for mixing a filter-aid material with the cooler oil, and filtering means for the final separation of precipitated wax and filter-aid material from the oil, said filtering means being adapted for relatively higher pressures.

4. Apparatus for dewaxing hydrocarbon oil comprising, in combination, chilling means for cooling the oil to temperatures adapted for the precipitation of paraffin wax constituents, means for mixing a filter-aid material with the chilled oil, settling means adapted for concentrating precipitated wax and filter-aid material in a portion of the oil, and filtering means for filtering wax and filter-aid material from said portion of oil.

5. Apparatus for dewaxing hydrocarbon oil comprising, in combination, chilling means for cooling the oil to temperatures adapted for the precipitation of paraffin wax constituents, means for mixing a filter-aid material with the chilled oil, filtering means for filtering wax and filter-aid material from the oil at relatively low pressures, means for cooling said partially dewaxed oil to a lower temperature adapted for further precipitation of paraffin wax constituents, means for mixing a filter-aid material with the cooler oil, and filtering means for finally filtering precipitated wax and filter-aid material from the oil, said filtering means being adapted for relatively high pressures.

6. The process of dewaxing hydrocarbon oil which comprises chilling the oil whereby higher melting wax constituents are precipitated, continuously settling the precipitated wax constituents to effect concentration of the wax in one portion of the oil, separating the concentrate from that portion of the oil from which the wax has been settled, filtering said concentrate in the presence of a filter-aid material to form a filtrate free from precipitated wax and filter-aid material, then chilling said filtrate together with the portion of oil from which wax was settled to a lower temperature whereby lower melting wax constituents are precipitated, and separating said wax constituents from the oil by filtration in the presence of a filter-aid material.

7. The process of dewaxing hydrocarbon oil which comprises chilling the oil whereby wax constituents are precipitated, concentrating the precipitated wax in one portion of the oil, separating the concentrate from that portion of the oil from which the wax has been concentrated, and filtering said concentrate in the presence of a filter-aid material to form a filtrate free from precipitated wax and filter-aid material.

8. The process of dewaxing hydrocarbon oil which comprises chilling the oil whereby wax constituents are precipitated, settling the precipitated wax constituents whereby concentration of the wax in one portion of the oil is effected, separating the concentrate from that portion of the oil from which the wax has been settled, and filtering said concentrate in the presence of a filter-aid material to form a filtrate free from precipitated wax and filter-aid material.

In witness whereof I have hereunto set my hand this 26th day of March, 1928.

ROBERT E. MANLEY.